No. 793,235. Patented June 27, 1905.

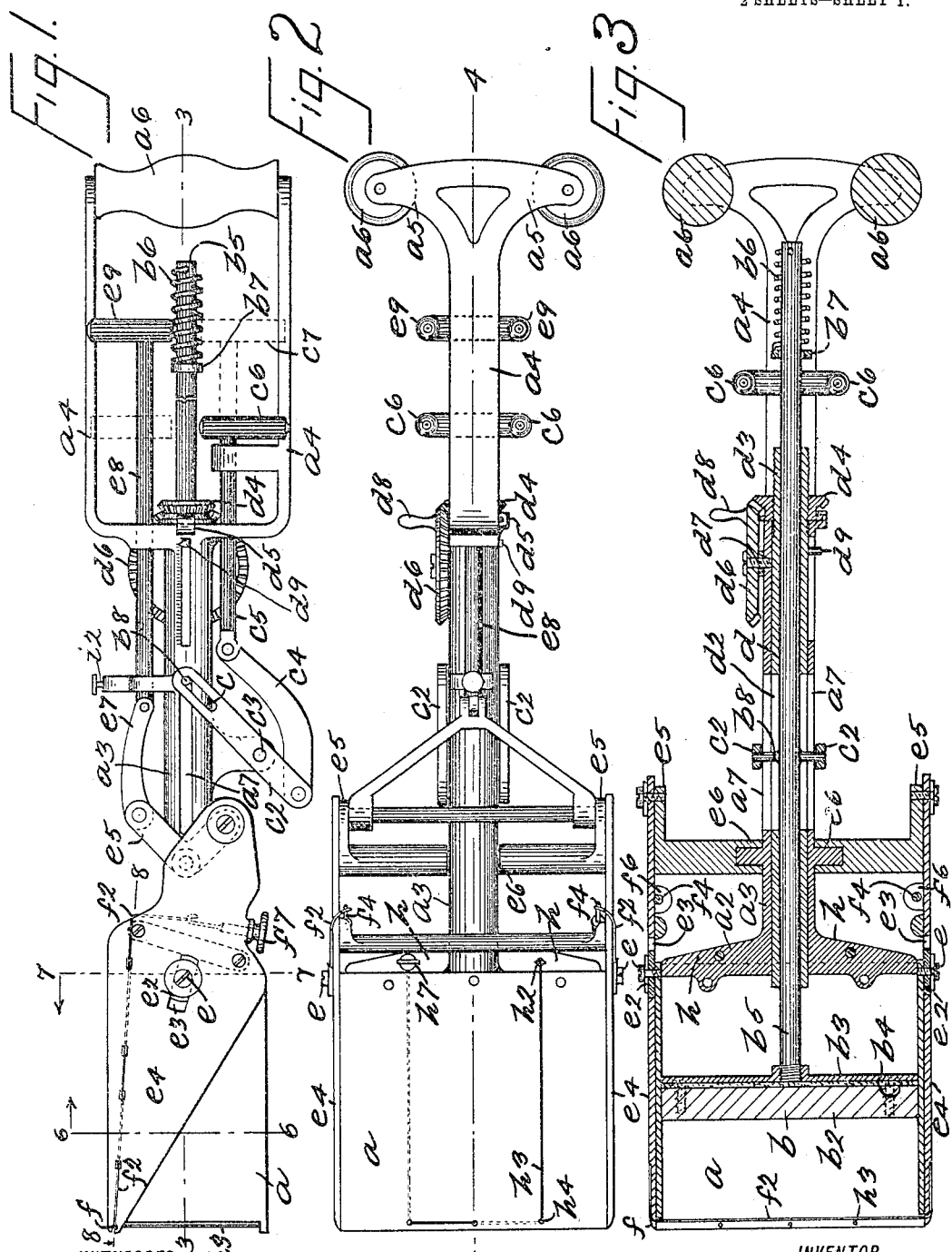

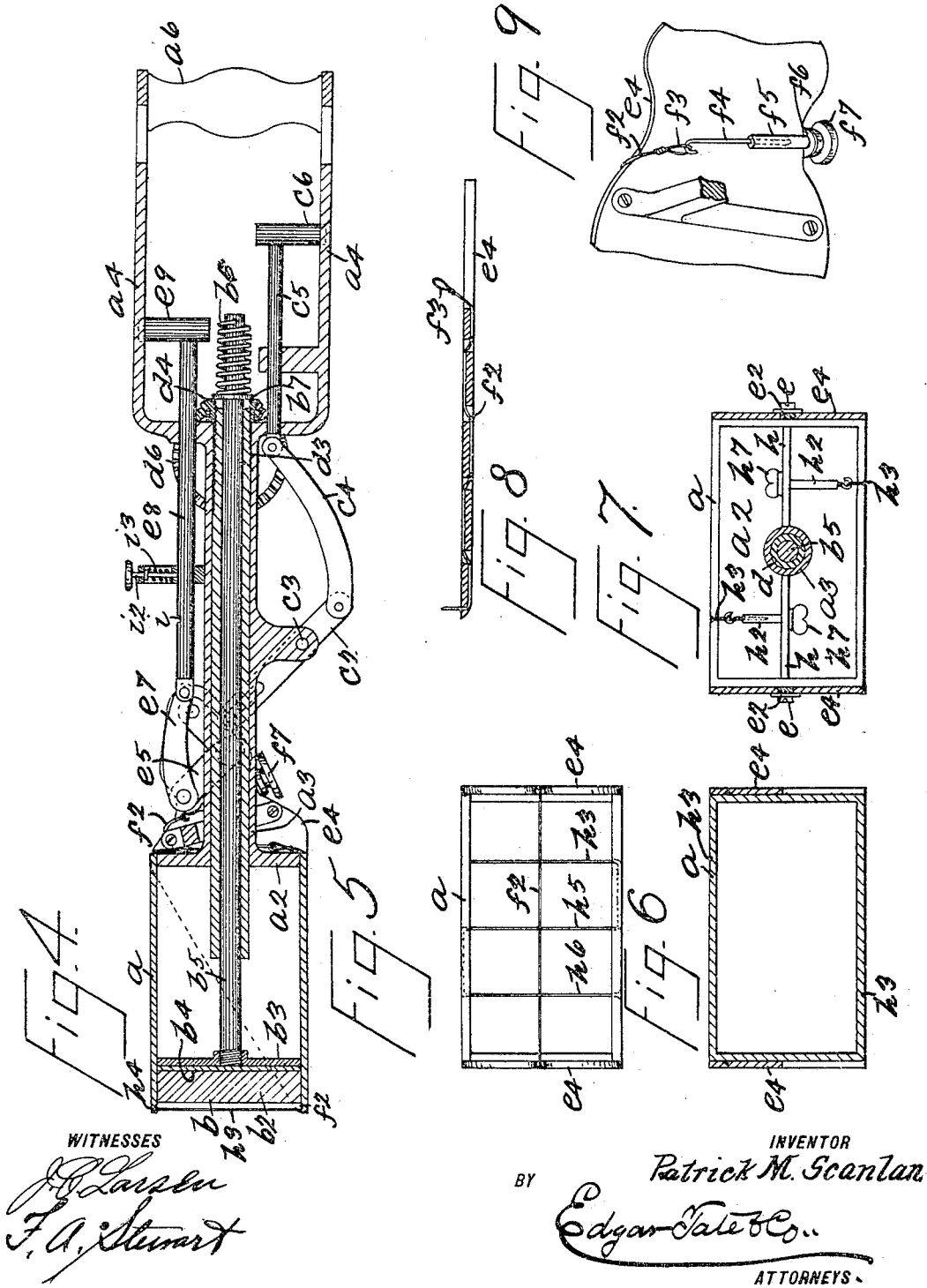

UNITED STATES PATENT OFFICE.

PATRICK M. SCANLAN, OF NEW YORK, N. Y.

BUTTER-CUTTER.

SPECIFICATION forming part of Letters Patent No. 793,235, dated June 27, 1905.

Application filed October 8, 1904. Serial No. 227,638.

*To all whom it may concern:*

Be it known that I, PATRICK M. SCANLAN, a citizen of the United States, residing at New York, in the county of New York and State of New York, have invented certain new and useful Improvements in Butter-Cutters, of which the following is a specification, such as will enable those skilled in the art to which it appertains to make and use the same.

The object of this invention is to provide an improved device for cutting butter in tubs and other vessels, so as to remove the butter from said tubs or vessels and at the same time divide it into predetermined weights for retailing and similar purposes, a further object being to provide a device of the class specified by which butter, cheese, lard, and similar articles may be cut into blocks of any desired form and weight, a still further object being to provide a device of this class whereby a block of butter removed from a tub or vessel containing the same may be forced from said device in its entirety or in a plurality of portions of predetermined sizes or weights; and with these and other objects in view the invention consists of a butter-cutter constructed as hereinafter described and claimed.

The invention is fully disclosed in the following specification, of which the accompanying drawings form a part, in which the separate parts of my improvement are designated by suitable reference characters in each of the views, and in which—

Figure 1 is a side elevation of a butter-cutter constructed according to my invention; Fig. 2, a plan view thereof; Fig. 3, a longitudinal section on the line 3 3 of Fig. 1; Fig. 4, a longitudinal section on the line 4 4 of Fig. 2; Fig. 5, an end view of my invention; Fig. 6, a section on the line 6 6 of Fig. 1; Fig. 7, a section on the line 7 7 of Fig. 1; Fig. 8, a partial section on the line 8 8 of Fig. 1, and Fig. 9 a perspective view of a portion of the apparatus employed in my invention.

In the practice of my invention I provide an oblong rectangular casing $a$, which in the form of construction shown is preferably of greater length horizontally than vertically, as clearly shown in Figs. 5, 6, and 7, and said casing $a$ is preferably composed of sheet metal, and one end thereof is closed by a head $a^2$, which is secured therein in any desired manner, and the head $a^2$ is provided with a tube $a^3$, which is secured therein or which may be integral therewith, and said tube is provided at its outer end with arms $a^4$, each of which is provided at its outer end with outwardly-directed arms $a^5$, which are provided at both sides with a handle $a^6$.

Within the casing $a$ is a plunger $b$, composed of a block $b^2$, of wood or other suitable material, and which may be formed into a mold, if desired, and a back plate $b^3$, between which and said block $b^2$ is a member $b^4$, composed of rubber, fiber, or other suitable material, forming a packing in said casing, and the members $b^2$, $b^3$, and $b^4$ of the plunger $b$ are secured together in any suitable manner.

Detachably connected with the back plate $b^3$ of the plunger $b$ is a rod $b^5$, which extends to a position adjacent to the handles $a^6$ and is provided with a spring $b^6$, secured therein at one end, and which carries at its other end a plate $b^7$, and the rod $b^5$ is provided with a pin $b^8$, passing therethrough and through a slot $a^7$ in the tube $a^3$, and the pin $b^8$ is engaged by a slot $c$ in a lever $c^2$, pivoted to the tube $a^3$, as shown at $c^3$, there being one of the levers $c^2$ at each side of said tube, and pivotally connected with the bottoms of said levers $c^2$ is a link $c^4$, which is in turn pivoted to a sliding rod $c^5$, mounted in the lower arm $a^4$, and which is provided with a handle $c^6$ on either side of the arm $a^4$, as clearly shown in Figs. 1 and 2, and, as will be seen, when the handles $c^6$ are drawn from the position shown in full lines to the position indicated in dotted lines at $c^7$ in Fig. 1 the levers $c^2$ force the pin $b^8$ outwardly, and thereby the rod $b^5$, as well as the plunger $b$, connected therewith, and if at this time a block of butter or other material be in the casing $a$ said block is forced out by this operation.

Arranged between the rod $b^5$ and the tube $a^3$ is a supplemental tube $d$, provided with a slot $d^2$ on either side thereof and in which the pin $b^8$ operates, and said supplemental tube $d$ normally extends from a position adjacent to the inward position of the plunger to a position slightly beyond the handle end of the tube $a^3$, and the inner end of the supplemental tube $d$ is provided with a screw-thread, as shown at $d^3$, which engages a similar thread in a pinion $d^4$, held in its relative position by means of a lug $d^5$ on the tube $a^3$, and, as shown in Fig. 3, in operative connection with the pinion $d^4$ is a gear-wheel $d^6$, pivoted at $d^7$ and provided with a handle $d^8$, and, as will be seen, when the handle $d^8$ and gear-wheel $d^6$ are rotated the pinion $d^4$ is also rotated and the supplemental tube $d$ is carried inwardly or outwardly, according to the direction of said rotation because of the screw-thread $d^3$, and the supplemental tube $d$ also carries a pointer $d^9$, adapted to operate in connection with a suitable scale arranged upon the tube $a^3$.

The casing $a$ is provided on either side thereof and adjacent to the head $a^2$ thereof with a bolt $e$, which passes through a slide-block $e^2$, adapted to operate in a corresponding recess $e^3$ of a cutter-blade $e^4$, arranged one on each side of said casing, and the cutter-blade $e^4$ is pivotally connected to a toggle-lever $e^5$, pivotally connected with the tube $a^3$, as shown at $e^6$, and with which is also connected a link $e^7$, which is pivotally connected with a slide-rod $e^8$, mounted in the upper arm $a^4$, connected with the tube $a^3$, and the slide-rod $e^8$ is provided with handles $e^9$, one on either side of the arm $a^4$ and similar to the handles $c^6$, and when the handles $e^9$ are moved from the position shown in full lines in Fig. 1 to the position indicated in dotted lines in said figure the toggle-lever $e^5$ is forced into the position shown in Fig. 4, and the cutting-blades $e^4$ are thereby carried into the position indicated in said figure, and the extreme outer end of each of said cutter-blades is provided with a slot $f$, into which passes a wire $f^2$, which is held therein and the ends of which are carried backwardly through suitable slots and recesses formed in said cutter-blades and as clearly shown in Fig. 8, and the ends of said wire $f^2$ are formed into loops $f^3$, which are engaged by a corresponding hook $f^4$, which is screw-threaded at its lower end and engages an upright member $f^5$, held in position by means of a bracket $f^6$ on said cutter-blades, and the member $f^5$ is also provided with a head $f^7$, by which it may be turned, and if the hook $f^4$ be held against rotation and the head $f^7$ be rotated the slack in the wire $f^2$ is taken up, as will be readily understood, and the wire $f^2$, because of the sliding pivot by which said cutter-blades are mounted, always moves along the outer edge of the casing $a$, and if the casing $a$ be forced into a tub of butter or other soft material and the handles $e^9$ and cutter-blades $e^4$, connected therewith, be operated as last described the wire $f^2$ will separate the material within the casing $a$ from the bulk of the material in the tub or vessel, and when said casing is removed from the tub the portion of material separated is removed therewith and may be forced out by the operation of the handles $c^6$, as previously described.

The head $a^2$ is provided with a rib $h$ on either side of the tube $a^3$, and passing through said rib, one on either side of the tube $a^3$ and preferably in opposite direction, are hooks $h^2$, similar to the hook $f^4$, already described, and connected with the hooks $h^2$ is a wire $h^3$, which passes forwardly over the top and outside of the casing $a$ and through an opening $h^4$ slightly beyond the position of the wire $f^2$, and the wire $h^3$ is carried downwardly through the bottom member of the casing $a$, through a recess formed therein and upwardly, as shown at $h^5$, and through a suitable recess on the top member of said casing $a$ and downwardly again, as shown at $h^6$, and thence backwardly, where it is engaged by the corresponding hook $h^2$, and rotation of the shanks $h^7$ of said hooks pulls the wire $h^3$ tight, and in the form of construction shown the wire $h^3$ divides the open end of the casing $a$ into four equal parts, and butter or other material forced into and out of said casing will be divided longitudinally into four sections by means of the wire $h^3$, and if the wire $f^2$ be placed in the position shown in Fig. 5 the butter on being forced out is divided into eight sections, as will be readily seen, and this position of the wire $f^2$ is determined by means of a notch $i$ in the slide-rod $e^8$, and said notch is adapted to be engaged at will by a pin $i^2$, normally forced upwardly by means of a spring $i^3$; but when it is desired to exactly locate the center of the casing $a$ or opening thereof the pin $i^2$ is forced downwardly, and the slide-rod $e^8$ moves until the said pin engages the recess $i$, at which time the cutter-blades and the wire $f^2$, carried thereby, are in the exact center of their movement. If the plunger $b$ be in its extreme backward position and the casing $a$ be forced into a tub of butter, lard, or similar material, that portion of the butter or other material entering the casing is divided into four equal parts, as already described, and if at this time the handles $e^9$ be operated the butter in the casing $a$ is separated from the bulk of butter in the tub, and the casing being removed carries the butter with it, as described, and if the handles $c^6$ be moved a slight distance and the handles $e^9$ again drawn back to their first position a correspondingly thick portion of the butter will be separated from the block of butter in the casing $a$ and at the same time will have been divided into four equal parts, and this operation may be repeated as often as desired, thereby producing thin slabs of butter, any number of which may be produced, and when the handles $c^6$ are operated to their full extent the plate $b^7$ striking against the gear $d^5$ compresses the spring $b^6$, and when the pressure on the handle $c^6$ is released the spring $b^6$ draws back the rod $b^5$ and plunger $b$ a short distance in order to remove it from the plane of movement of the wire $f^2$, for if said wire $f^2$ was moved while the plunger $b$ was at its extreme outward position said wire would be broken, as will be readily seen; but by means of the spring $b^6$ the plunger is forced back and the wire $f^2$ is not injured thereby. If it is desired to remove a predetermined portion of a block of butter from the tub, the gear-wheel $d^6$ is operated and in turn operates the pinion $d^4$, which moves the supplemental tube $d$ outwardly, the position thereof being indicated by means of the pointer $d^9$ and the scale over which it moves, and when the pointer reaches the desired position on said scale the supplemental tube $d$ is in a corresponding position, and the plunger $b$ cannot be drawn farther back than the said tube, and a correspondingly great or small piece of butter may be thereby removed from the tub.

Although I have shown in Fig. 5 the wire $h^3$ so arranged as to divide the casing $a$ or opening thereof into four equal parts, it will be apparent that the said wire may be passed upwardly, downwardly, or across said opening any number of times, thereby producing a large number of pieces of butter, and said pieces of butter being sliced off as desired by the operation of the cutter-blades $e^1$, the pieces of butter resulting from this operation being intended for hotel use or for similar purposes, and various other changes in and modifications of the construction herein shown and described may be made without departing from the spirit of my invention or sacrificing its advantages.

Having fully described my invention, what I claim as new, and desire to secure by Letters Patent, is—

1. A device of the class described, comprising a casing open at one end, a tube connected with the other end thereof, a handle on said tube, cutter-blades pivotally mounted on said casing, one on each side thereof, a supplemental tube in said first-named tube, a rod in said supplemental tube and devices for moving said supplemental tube, said rod and said cutter-blades independently of each other, substantially as shown and described.

2. A device of the class described, comprising a casing open at one end, a tube connected with the other end thereof, a handle on said tube, cutter-blades pivotally mounted on opposite sides of said casing, a wire connected with said cutter-blades and operating over the open end of said casing, a plunger in said casing, devices for moving said cutter-blades and thereby said wire over the open end of said casing, levers connected with said plunger, a link connected with said levers and handles connected with said link for operating said levers and thereby said plunger, substantially as shown and described.

3. A device of the class described, comprising a casing open at one end, a tube connected with the other end thereof, a handle on said tube, cutter-blades pivotally mounted on opposite sides of said casing, a wire connected with said cutter-blades and operating over the open end of said casing, a plunger in said casing, devices for moving said cutter-blades and thereby said wire over the open end of said casing, levers connected with said plunger, a link connected with said levers and handles connected with said link for operating said levers and thereby said plunger, and devices for limiting the movement of said plunger, substantially as shown and described.

4. A device of the class described, comprising a casing open at one end, a tube connected with the other end thereof, a handle on said tube, cutter-blades pivotally mounted on opposite sides of said casing, a wire connected with said cutter-blades and operating over the open end of said casing, a plunger in said casing, devices for moving said cutter-blades and thereby said wire over the open end of said casing, levers connected with said plunger, a link connected with said levers and handles connected with said link for operating said levers and thereby said plunger, and devices for limiting the movement of said cutter-blades and said wire carried thereby, substantially as shown and described.

5. In a device of the class described, a casing one end of which is open, a tube connected with the other end thereof, a supplemental tube mounted in said first-named tube, a plunger in said casing, a rod connected therewith and operating in said supplemental tube, a pin through said rod and operating in slots in said tube and said supplemental tube, levers connected with said pin on either side of said tube, and handles connected with said levers for moving said pin, rod and plunger, and cutter-blades mounted on opposite sides of said casing and pivoted slidably to said casing, handles for operating said cutter-blades, a wire carried by said cutter-blades and operating over the open end of said casing, and external devices for operating said supplemental tube longitudinally, substantially as shown and described.

6. A device of the class described, comprising a casing open at one end, a tube connected with the other end thereof, a handle on said tube, a plunger in said casing, cutter-blades on said casing, a wire carried by said cutter-blades, a supplemental tube mounted in said first-named tube and the end of which adjacent to said handle is provided with a screw-thread, an internally-threaded pinion in operation with said supplemental tube and a gear-wheel provided with a handle on said tube and enmeshed with said pinion, substantially as shown and described.

7. A device of the class described, comprising a casing open at one end, a tube connected with the other end thereof, a handle on said tube, a plunger in said casing, cutter-blades on said casing, a wire carried by said cutter-blades, a toggle-lever for each of said cutter-blades and pivoted to said tube, a link pivoted to both of said toggle-levers, a rod slidably mounted above said tube and pivotally connected with said link and a spring-operated pin adapted to enter a recess in said sliding rod and thereby limit the operation of said cutter-blades, substantially as shown and described.

8. In a device of the class described, a casing open at one end, a tube connected with the other end thereof, a plunger in said casing, cutter-blades mounted on opposite sides of said casing, devices for moving said cutter-blades, a wire carried by said cutter-blades at the outer ends thereof and adapted to pass over the open end of said casing, adjusting devices for said wire, said cutter-blades being provided with suitable recesses whereby said wire is buried or sunk therein, devices for moving said plunger, a supplemental tube within said first-named tube, devices for moving and determining the movement of said supplemental tube, a wire passing vertically over the open end of said casing and devices for adjustably securing the ends of said wire, substantially as shown and described.

9. In a device of the class described, a casing open at one end, a tube connected with the other end thereof, a plunger in said casing, a rod connected with said plunger, devices for operating said plunger and a spring secured to said rod and adapted to automatically withdraw said plunger from its extreme outer position, substantially as shown and described.

In testimony that I claim the foregoing as my invention I have signed my name, in presence of the subscribing witnesses, this 7th day of October, 1904.

PATRICK M. SCANLAN.

Witnesses:
C. J. KLEIN,
F. A. STEWART.